United States Patent
Booth et al.

(10) Patent No.: US 8,189,851 B2
(45) Date of Patent: May 29, 2012

(54) OPTICALLY CLEAR DIAPHRAGM FOR AN ACOUSTIC TRANSDUCER AND METHOD FOR MAKING SAME

(75) Inventors: Jeffrey Davis Booth, Dunstable, MA (US); Stefan Bokaemper, Boston, MA (US); Robert H. White, Jr., Roslindale, MA (US)

(73) Assignee: EMO Labs, Inc., Waltham, MA (US)

(*) Notice: Subject to any disclaimer, the term of this patent is extended or adjusted under 35 U.S.C. 154(b) by 722 days.

(21) Appl. No.: 12/399,840

(22) Filed: Mar. 6, 2009

(65) Prior Publication Data

US 2010/0224437 A1 Sep. 9, 2010

(51) Int. Cl.
*H04R 1/00* (2006.01)
*H04R 1/20* (2006.01)
*H04R 7/00* (2006.01)
*H04R 25/00* (2006.01)
*H01L 41/00* (2006.01)

(52) U.S. Cl. ........ 381/426; 181/166; 181/167; 310/317; 310/324; 381/152; 381/345; 381/423; 381/431

(58) Field of Classification Search .................. 381/426, 381/345, 152, 164; 181/166, 167
See application file for complete search history.

(56) References Cited

U.S. PATENT DOCUMENTS

| | | | |
|---|---|---|---|
| 2,895,062 A | 7/1959 | Abott | |
| 3,093,710 A | 6/1963 | Ten Eyck | |
| 3,509,387 A | 4/1970 | Thorn | |
| 3,544,201 A | 12/1970 | Fowler | |
| 4,047,060 A | 9/1977 | Schafft | |
| 4,056,742 A | 11/1977 | Tibbetts | |
| 4,088,915 A | 5/1978 | Kodama | |
| 4,140,203 A * | 2/1979 | Niguchi et al. | 181/167 |
| 4,170,742 A | 10/1979 | Itagaki | |
| 4,181,865 A | 1/1980 | Kohyama | |
| 4,186,323 A | 1/1980 | Cragg | |
| 4,297,185 A * | 10/1981 | Chevreux et al. | 522/96 |
| 4,315,557 A * | 2/1982 | Nakaya et al. | 181/168 |
| 4,352,961 A | 10/1982 | Kumada | |
| 4,454,386 A | 6/1984 | Koyano | |

(Continued)

FOREIGN PATENT DOCUMENTS

FR 2649575 1/1991

(Continued)

OTHER PUBLICATIONS

The Engineering ToolBox, Elastic Properties and Young Modulus for some Materials, accessed on Mar. 16, 2012, http://www.engineeringtoolbox.com/young-modulus-d_417.html.*

(Continued)

*Primary Examiner* — David S. Warren
*Assistant Examiner* — Christina Russell
(74) *Attorney, Agent, or Firm* — Brown Rudnick LLP; Thomas Meyers

(57) ABSTRACT

The present disclosure relates to a diaphragm that may be used with a mechanical-to-acoustical transducer. The diaphragm may include a layer of optically clear film, a damping layer and another layer of optically clear film. The damping layer may be an adhesive. The diaphragm may also comprise two optically clear films, optionally including a damping layer, wherein the films indicate a desired coefficient of linear thermal expansion in one or both of the machine and transverse directions.

6 Claims, 12 Drawing Sheets

U.S. PATENT DOCUMENTS

| | | | |
|---|---|---|---|
| 4,503,564 A | 3/1985 | Edelman | |
| 4,571,553 A | 2/1986 | Yokoyama | |
| 4,578,613 A | 3/1986 | Posthuma de Boer | |
| 4,593,160 A | 6/1986 | Nakamura | |
| 4,607,145 A | 8/1986 | Ravinet | |
| 4,618,814 A | 10/1986 | Kato | |
| 4,625,138 A | 11/1986 | Ballato | |
| 4,625,259 A | 11/1986 | Krechmer | |
| 4,638,207 A | 1/1987 | Radice | |
| 4,680,800 A | 7/1987 | Bank | |
| 4,807,294 A | 2/1989 | Iwata | |
| 4,864,624 A | 9/1989 | Tichy | |
| 4,969,197 A | 11/1990 | Takaya | |
| 4,979,219 A | 12/1990 | Lin | |
| 4,992,692 A | 2/1991 | Dias | |
| 5,031,222 A | 7/1991 | Takaya | |
| 5,115,472 A | 5/1992 | Park | |
| 5,193,119 A | 3/1993 | Tontini | |
| 5,282,768 A | 2/1994 | Akman | |
| 5,283,835 A | 2/1994 | Athanas | |
| 5,388,160 A | 2/1995 | Hashimoto | |
| 5,428,832 A | 6/1995 | Nohara | |
| 5,473,214 A | 12/1995 | Hildebrand | |
| 5,524,058 A | 6/1996 | Moseley | |
| 5,526,421 A | 6/1996 | Berger | |
| 5,575,827 A | 11/1996 | Piniecki | |
| 5,608,282 A | 3/1997 | Wilber | |
| 5,615,270 A | 3/1997 | Miller | |
| 5,638,454 A | 6/1997 | Jones | |
| 5,638,456 A | 6/1997 | Conley | |
| 5,642,332 A | 6/1997 | Chang | |
| 5,652,801 A | 7/1997 | Paddock | |
| 5,676,612 A | 10/1997 | Schellekens | |
| 5,684,884 A | 11/1997 | Nakaya | |
| 5,705,878 A | 1/1998 | Lewis | |
| 5,711,058 A | 1/1998 | Frey | |
| 5,736,808 A | 4/1998 | Szilagyi | |
| 5,751,827 A | 5/1998 | Takahashi | |
| 5,767,612 A * | 6/1998 | Takeuchi et al. | 310/324 |
| 5,780,958 A | 7/1998 | Strugach | |
| 5,802,195 A | 9/1998 | Regan | |
| 5,825,902 A | 10/1998 | Fujishima | |
| 5,856,956 A | 1/1999 | Toki | |
| 5,867,302 A | 2/1999 | Fleming | |
| 5,901,231 A | 5/1999 | Parrella | |
| 5,965,249 A * | 10/1999 | Sutton et al. | 428/304.4 |
| 5,973,441 A | 10/1999 | Lo | |
| 5,977,688 A | 11/1999 | Utsunomiya | |
| 6,003,766 A | 12/1999 | Azima | |
| 6,023,123 A | 2/2000 | Petiet | |
| 6,028,389 A | 2/2000 | Bernstein | |
| 6,031,926 A | 2/2000 | Azima | |
| 6,058,196 A | 5/2000 | Heron | |
| 6,060,811 A | 5/2000 | Fox | |
| 6,064,746 A | 5/2000 | Nakamura | |
| 6,144,746 A | 11/2000 | Azima | |
| 6,151,402 A | 11/2000 | Azima | |
| 6,181,797 B1 | 1/2001 | Parrella | |
| 6,188,775 B1 | 2/2001 | Azima | |
| 6,195,440 B1 | 2/2001 | Warnaka | |
| 6,198,831 B1 | 3/2001 | Azima | |
| 6,215,881 B1 | 4/2001 | Azima | |
| 6,215,882 B1 | 4/2001 | Heron | |
| 6,215,884 B1 | 4/2001 | Parrella | |
| 6,218,766 B1 | 4/2001 | Warnaka | |
| 6,243,473 B1 | 6/2001 | Azima | |
| 6,247,551 B1 | 6/2001 | Heron | |
| 6,278,790 B1 | 8/2001 | Davis | |
| 6,294,859 B1 | 9/2001 | Jaenker | |
| 6,427,017 B1 | 7/2002 | Toki | |
| 6,437,485 B1 | 8/2002 | Johansson | |
| 6,472,797 B1 | 10/2002 | Kishimoto | |
| 6,504,286 B1 | 1/2003 | Porat | |
| 6,522,460 B2 | 2/2003 | Bonnedal | |
| 6,522,760 B2 * | 2/2003 | Azima et al. | 381/152 |
| 6,570,299 B2 | 5/2003 | Takeshima | |
| 6,617,765 B1 | 9/2003 | Lagier | |
| 6,708,797 B2 | 3/2004 | Long | |
| 6,720,708 B2 * | 4/2004 | Athanas | 310/324 |
| 6,720,709 B2 | 4/2004 | Porat | |
| 6,785,393 B2 | 8/2004 | Lipponen | |
| 6,797,396 B1 * | 9/2004 | Liu et al. | 428/483 |
| 6,844,657 B2 | 1/2005 | Miller | |
| 7,009,326 B1 | 3/2006 | Matsuo | |
| 7,010,143 B2 * | 3/2006 | Kam | 381/426 |
| 7,015,624 B1 | 3/2006 | Su | |
| 7,020,302 B2 | 3/2006 | Konishi | |
| 7,038,356 B2 * | 5/2006 | Athanas | 310/324 |
| 7,039,206 B2 | 5/2006 | Mellow | |
| 7,050,600 B2 | 5/2006 | Saiki | |
| 7,120,263 B2 | 10/2006 | Azima | |
| 7,151,837 B2 | 12/2006 | Bank | |
| 7,174,025 B2 | 2/2007 | Azima | |
| 7,194,098 B2 | 3/2007 | Azima | |
| 7,212,648 B2 | 5/2007 | Saiki | |
| 7,236,602 B2 | 6/2007 | Gustavsson | |
| 7,274,855 B2 | 9/2007 | Nevo | |
| 7,339,736 B2 | 3/2008 | Trapani | |
| 7,536,211 B2 | 5/2009 | Saiki | |
| 7,565,949 B2 | 7/2009 | Tojo | |
| 7,583,811 B2 | 9/2009 | Wada | |
| 7,788,808 B1 * | 9/2010 | Ptak | 29/897.2 |
| 7,792,319 B2 | 9/2010 | Kimura | |
| 7,884,529 B2 | 2/2011 | Johnson | |
| 7,889,601 B2 * | 2/2011 | Goodmote et al. | 367/176 |
| 7,903,091 B2 | 3/2011 | Lee | |
| 8,033,674 B1 * | 10/2011 | Coleman et al. | 362/19 |
| 8,068,635 B2 * | 11/2011 | Carlson et al. | 381/426 |
| 2001/0026626 A1 | 10/2001 | Athanas | |
| 2001/0038701 A1 * | 11/2001 | Corynen | 381/152 |
| 2001/0052627 A1 | 12/2001 | Takahashi | |
| 2002/0044668 A1 * | 4/2002 | Azima | 381/152 |
| 2002/0153194 A1 * | 10/2002 | Pocock et al. | 181/167 |
| 2004/0037441 A1 | 2/2004 | Konishi | |
| 2004/0189151 A1 | 9/2004 | Athanas | |
| 2004/0228501 A1 | 11/2004 | Saiki | |
| 2005/0180592 A1 | 8/2005 | Miura | |
| 2005/0288039 A1 | 12/2005 | Liou | |
| 2006/0066803 A1 * | 3/2006 | Aylward et al. | 349/158 |
| 2006/0269087 A1 * | 11/2006 | Johnson et al. | 381/164 |
| 2006/0290236 A1 | 12/2006 | Ikehashi | |
| 2007/0003100 A1 | 1/2007 | Liu | |
| 2007/0007859 A1 | 1/2007 | Weber | |
| 2007/0092088 A1 | 4/2007 | Chang | |
| 2007/0243364 A1 | 10/2007 | Maekawa | |
| 2007/0260019 A1 * | 11/2007 | Ohme et al. | 525/400 |
| 2008/0007829 A1 | 1/2008 | Mizushima | |
| 2008/0138541 A1 * | 6/2008 | Moto et al. | 428/1.1 |
| 2009/0136690 A1 | 5/2009 | Sasada | |
| 2009/0200896 A1 | 8/2009 | Morris | |
| 2009/0285431 A1 * | 11/2009 | Carlson et al. | 381/345 |
| 2009/0317592 A1 * | 12/2009 | Yoshitomi et al. | 428/142 |
| 2010/0224437 A1 | 9/2010 | Booth | |
| 2011/0033074 A1 | 2/2011 | Chang | |

FOREIGN PATENT DOCUMENTS

| | | |
|---|---|---|
| JP | 52045923 | 4/1977 |
| JP | 5615182 | 7/1979 |
| JP | 57181298 | 11/1982 |
| JP | 58034699 | 3/1983 |
| JP | 58182999 | 10/1983 |
| JP | 63176098 | 7/1988 |
| JP | 63176099 | 7/1988 |
| JP | 63250995 | 10/1988 |
| JP | 6429097 | 2/1989 |
| JP | 334391 | 4/1991 |
| JP | 4140999 | 5/1992 |
| JP | 5122793 | 5/1993 |
| JP | 6217296 | 8/1994 |
| JP | 8102988 | 4/1996 |
| JP | 9298798 | 11/1997 |
| JP | 10094093 | 4/1998 |
| JP | 10327491 | 12/1998 |
| JP | 11215578 | 8/1999 |
| JP | 2000350285 | 12/2000 |
| JP | 2000356808 | 12/2000 |
| JP | 2001503552 | 3/2001 |

| | | |
|---|---|---|
| JP | 2001320798 | 11/2001 |
| NL | 1369241 | 10/1974 |
| WO | 9810252 | 3/1998 |
| WO | 9828942 | 7/1998 |
| WO | 0152400 | 7/2001 |
| WO | 2004030406 | 4/2004 |

OTHER PUBLICATIONS

Azom.com, A to Z of Materials, Cellulose Acetate—CA, added May 7, 2001, accessed Mar. 16, 2012, http://www.azom.com/article.aspx?ArticleID=383.*

PolymerProcessing.com, Poly(ethylene terephthalate), copyrighted 2000, 2001, accessed Mar. 16, 2012, http://www.polymerprocessing.com/polymers/PET.html.*

International Standard, "Adhesives—Peel test for a flexible-bonded-to-rigid test specimen assembly—Part 1: 90° peel" ISO Reference No. ISO/FDIS 8510-1:2006(E).

Harris, N., "The Distributed-Mode Loudspeaker (DML) as a Broad-Band Acoustic Radiator", Audio Engineering Society Preprint 4526 (D-6); Presented at the 103rd Convention, Sep. 26, 1997, New York (5 pages).

Furutani, et al., "Displacement control of piezoelectric element by feedback of induced charge," Nanotechnology 9, Jun. 1, 1998, retrieved from the internet: <URL: http://toyota-ti.ac.jp/Lab/Kikai/5k60/furutani/paper/data|nanoic92.pdf>, pp. 93-98.

Kugel, V.D., et al., "Bimorph-based Piezoelectric Air Acoustic Transducer: Model", Sensors and Actuators A 69 (Jun. 15, 1998), 234-42 (9 pages).

Backman, et al., Improving Piezoelectric Speakers with Feedback, Proc. AES Convention 106, (May 8, 1999).

International Search Report & Written Opinion for PCT Appl. No. PCT/US01/00349, dated Apr. 30, 2001 (4 pages).

International Preliminary Examination Report for PCT/US01/00349, dated Nov. 22, 2002.

EPO Search report for EP Appl. No. 01901776.3, dated Apr. 26, 2005 (6 pages).

EPO Supplementary Search Report for EP Appl. No. 01901776.3, dated Aug. 3, 2005 (6 pages).

EPO Search report for EP Appl. No. 01901776.3, dated Nov. 2, 2005 (5 pages).

Beck, et al., "Hysteresis Characterization Using Charge Feedback Control for a LIPCA Device," Proc. SPIE Int. Soc. for Opt. Eng., Mar. 30, 2006, vol. 6170 (10 pages).

International Search Report and Written Opinion of PCT Appl. No. PCT/US06/21189, dated Nov. 21, 2006 (8 pages).

International Search Report and Written Opinion dated Nov. 13, 2009 in PCT Application No. PCT/US09/44544 (13 pages).

The Physics Classroom, "Light Waves and Color-Lesson 1, How do we know light behaves as a wave?" (first cited Dec. 10, 2009) accessed on Mar. 28, 2012 at http://www.physicsclassroom.com/Class/light/U12L1a.cfm (2 pages).

Edmund Optics Worldwide, "TECHSPEC Linear Polarizing Laminated Film," (first cited Dec. 10, 2009) accessed on Mar. 28, 2012 at http://www.edmundoptics.com/onlinecatalog/displayproduct.cfm?productID'1912 (2 pages).

International Search Report and Written Opinion dated Oct. 6, 2010, in PCT Application No. PCT/US2010/045628.

Decision of Dismissal of Amendment mailed Sep. 27, 2011, in Japanese Patent Application No. 2007-066645, filed Mar. 15, 2007.

* cited by examiner $d2 \geq 0.25 * d1$

ОПТICALLY CLEAR DIAPHRAGM FOR AN
ACOUSTIC TRANSDUCER AND METHOD
FOR MAKING SAME

FIELD OF THE INVENTION

This application is directed at an optically clear diaphragm that may be utilized in a mechanical-to-acoustical transducer for the purpose of generating sound. The diaphragm is one that provides a desired damping value over a selected frequency range and/or that exhibits a desired coefficient of linear thermal expansion (CLTE) and/or desired stiffness to allow for a desired construction of the transducer frame. Such characteristics may be supplied by a diaphragm which contains at least two optically clear films optionally adhered to each other via a damping layer.

BACKGROUND OF THE INVENTION

Mechanical-to-acoustical transducers may have an actuator that may be coupled to an edge of a speaker membrane or diaphragm that may then be anchored and spaced from the actuator. Such a system may provide a diaphragm-type speaker where a display may be viewed through the speaker. The actuators may be electromechanical, such as electromagnetic, piezoelectric or electrostatic. Piezo actuators do not create a magnetic field that may then interfere with a display image and may also be well suited to transform the high efficiency short linear travel of the piezo motor into a high excursion, piston-equivalent diaphragm movement.

One example of mechanical-to-acoustical transducer including an actuator that may be coupled to an edge of a diaphragm material is recited in U.S. Pat. No. 7,038,356. The use of a support and actuator that was configured to be responsive to what was identified as surrounding conditions of, e.g., heat and/or humidity, is described in U.S. Publication No. 2006/0269087.

SUMMARY

In a first exemplary embodiment, the present disclosure relates to a diaphragm for use with a mechanical-to-acoustical transducer comprising:
(a) a layer of optically clear film;
(b) a damping layer;
(c) a layer of optically clear film;
wherein the diaphragm has a composite damping value of tan delta equal to or greater than 0.04 in the frequency range of 500 Hz to 2000 Hz at 30° C., wherein the diaphragm has a total luminous transmittance of equal to or greater than 75%.

In a second exemplary embodiment, the present disclosure relates to a diaphragm for use with a mechanical-to-acoustical transducer comprising:
(a) a layer of optically clear film;
(b) a damping layer;
(c) a layer of optically clear film;
wherein the damping layer has a damping value of tan delta that is equal to or greater than 0.1 at said frequency range from 500 Hz to 2000 Hz at 30° C.

In a third exemplary embodiment, the present disclosure relates to a diaphragm for use with a mechanical-to-acoustical transducer comprising at least two optically clear films, wherein said films indicate a coefficient of linear thermal expansion (CLTE) in one of the machine direction and transverse direction equal to or below 50 μm/m/° C. when measured at the temperature range of 20° C. to 50° C. and wherein the total luminous transmittance of said diaphragm is equal to or greater than 75%.

DETAILED DESCRIPTION

A mechanical-to-acoustical transducer, coupled to a diaphragm, for the purpose of producing audio sound, is disclosed in U.S. Pat. No. 7,038,356 and U.S. Publication No. 2006/0269087, whose teachings are incorporated herein by reference. In one configuration, the transducer amounts to a piezo motor coupled to a diaphragm so that the excursion of the actuator is translated into a corresponding, mechanically amplified excursions of the diaphragm. The diaphragm may be curved and when optically clear, can be mounted on a frame over a video display to provide an audio speaker When constructing an optically clear transducer in front of a video display there may be a number of applicable design objectives. For example, one may desire to reproduce an audio signal with a relatively smooth frequency response, with a relatively high speaker efficiency and with relatively low acoustic distortion while at the same time minimizing optical distortions of the image of the underlying video display. One may also allow the surface to be coated with a desirable optical coating, providing sufficient surface hardness, impact and scratch resistance for long term use and minimizing the production cost of said transducer. Furthermore, one may want to choose the CLTE of frame and diaphragm to be relatively close to each other to minimize unwanted distortions of the diaphragm when temperatures change. The choice of material type and construction of the diaphragm may be one of the decisions that determine how well a given design objective may be achieved. Other aspects are the design of the actuator, the curve shape of the diaphragm, the attachment of the diaphragm to the transducer frame, the construction and the relative stiffness of the transducer frame as well as the design of the drive electronics.

Parameters that may now be considered in determining the usefulness of a diaphragm towards achieving one or more of the design objectives noted above may include one or more of the following: its elastic and compressive modulus, its density, its thickness, its stiffness, its damping, its coefficient of in-plane linear thermal expansion, its optical transparency and haze, its yellowness, its UV stability, its impact resistance and toughness, its hardness, its ability to be easily coated with a wide range of optical coatings and its cost. There are many types of optically clear materials available that might be used as a diaphragm; however they may not have desirable performance in one or more of the above parameters at the same time. For example, many materials may not possess a desired internal damping property.

Accordingly, there has been a need for a diaphragm that possesses one or more of the above referenced desirable properties while at the same time providing a relatively high degree of internal damping.

Figure 1:
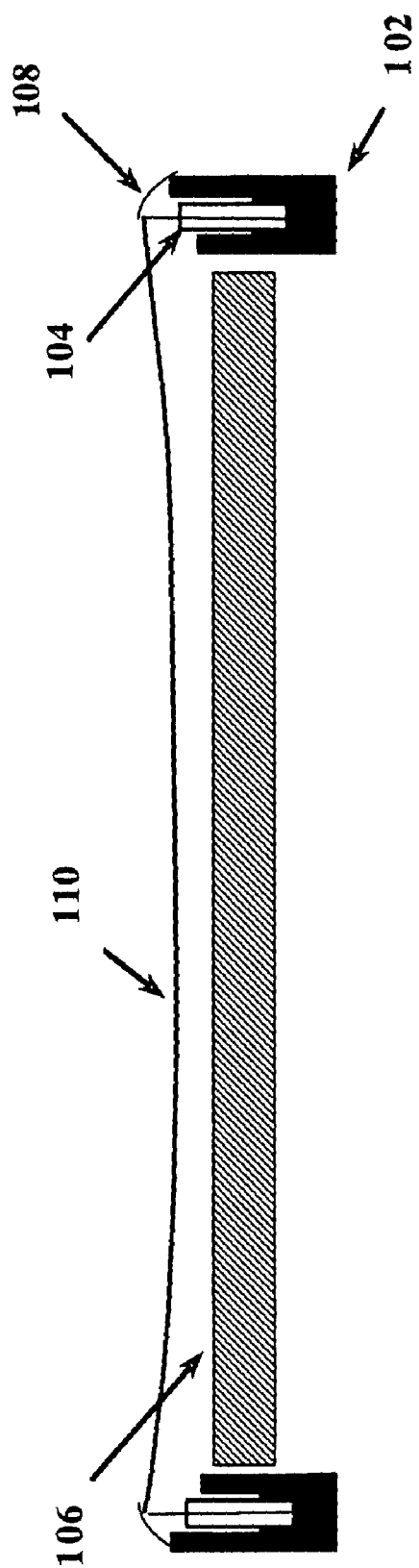
FIG. 1 is a cross-sectional view of one example of a mechanical-to-acoustical transducer.

Attention is directed to FIG. 1 which is a cross-sectional view of one example of a mechanical-to-acoustical transducer 104 coupled to the edge of a diaphragm 110. At 108 is a sealing element (sometimes also called surround in the art) and 106 may be, e.g., a video display. The frame is shown at 102 where the frame material preferably has an elastic modulus of not less than 30 GPa. Typically this may be achieved with a metal or a polymer, including a reinforced polymer (e.g. a polymer containing inorganic filler such as glass). Such materials may also have a CLTE of equal to or less than 35 μm/m/° C., i.e. between 5 μm/m/° C. to 35 μm/m/° C., including all values therein in 1.0 μm/m/° C. increments.

Furthermore, in order to reduce optical distortion due to changes of temperature the CLTE of the diaphragm (110) may be configured to be relatively close to the CLTE of the frame. For example, the difference should be less than or equal to 20 μm/m/° C., preferably it should be less than or equal to 10 μm/m/° C. and even more preferably it should be less than or equal to 5 μm/m/° C. The CLTE of the diaphragm generally should be at or below 50 μm/m/° C., preferably at or below 40 μm/m/° C. and even more preferably at or below 35 μm/m/° C. Such CLTE is desirably present in both in-plane dimensions of the diaphragm.

It is worth pausing and noting that poly(ethylene terephtalate) (PET) on its own had been considered as a suitable diaphragm due to its relative stiffness and the feature that it is a relatively low cost material, together with the fact that it is also available with optical coatings. One problem was that as applied for use in a mechanical-to-acoustical transducer where it was coupled to at least one edge, it was not available in the required combination of thickness and optical quality. In order to overcome this problem the above referenced lamination approach was employed along with the use of a pressure sensitive adhesive (PSA). It was then recognized that the PSA not only allowed for the production of the laminate, but also could be configured to be optically clear as well as also providing damping to the entire laminate. With attention directed to FIG. 5, a comparison of a speaker frequency response between one relative stiff adhesive (UV cured: E~1 GPa) and relatively soft, dampened PSA adhesive (E~5 MPa)—both for PET laminate (i.e. two layers of PET). As can be seen, the smoothness of the frequency response was much improved in the range of 500 Hz to 2000 Hz due to the use of a relatively well damped and soft PSA adhesive as a laminating material.

Figure 2:
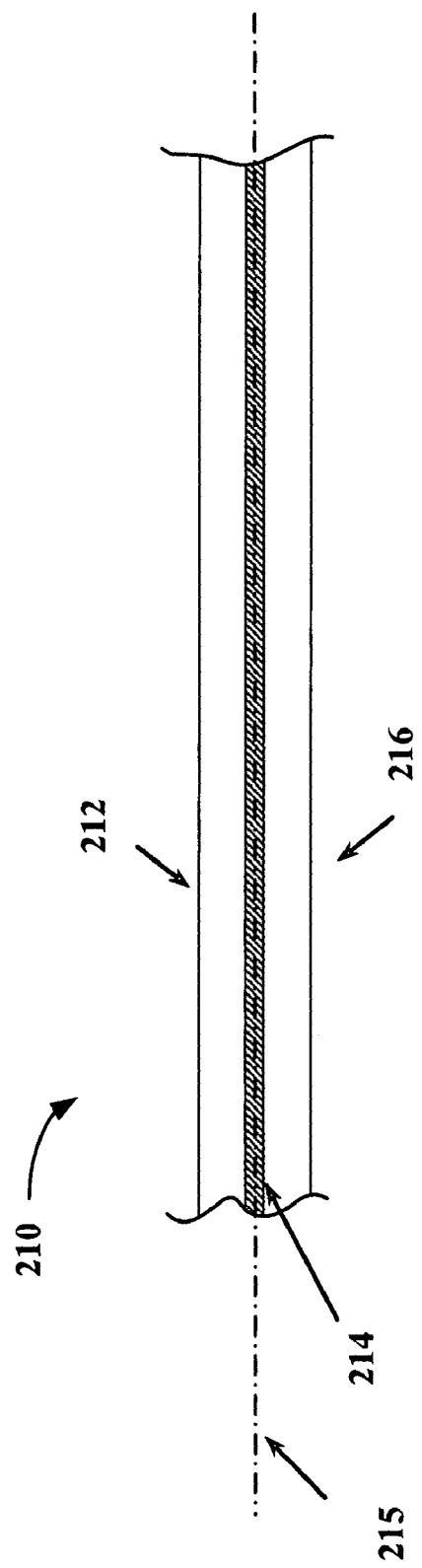
FIG. 2 is a cross-sectional view of one example of a two layer optically clear diaphragm containing one damping layer.

In a first embodiment illustrated in FIG. 2, an optically clear diaphragm (210) may be constructed with at least two optically clear films (212, 216). Shown at 215 is the centerline of the damping layer 214. The films 212 and 216 themselves may be suitable for use with the mechanical-to-acoustical transducer but not provide, on their own, a desired amount of damping. However, the use of at least one layer of an optically clear damped material (214) may therefore lead to a desired damping characteristic for the entire diaphragm.

Or stated another way, the overall damping of the diaphragm is higher than the damping that would otherwise be present in the absence of the damping layer. Furthermore, the diaphragm herein may also be described as containing at least two layers of optically clear film, and a damping layer therebetween wherein the damping layer provides a relatively higher damping value than the other two layers of film material. In addition, the diaphragm herein is one that may overlie all or a portion of a display that provides visual information (text and/or images) to a consumer.

The damping layer may itself comprise an optically clear material, and as disclosed herein, may have a characteristic damping performance. The damping layer may provide adhesive as between the layers 212 and 216. Such adhesion may be created by the application of pressure and/or heat. Such adhesion may also be developed as a consequence of a chemical reaction, e.g. polymerization of a liquid precursor. Such chemical reaction may be the result of an energy input, such as heat or light energy (e.g. UV light).

Through a combination of thickness and elastic modulus control the diaphragm now may achieve sufficient flexural and compressive stiffness to allow it to resist internal acoustic pressure within the transducer enclosure without loss of desired low frequency output due to diaphragm breakup. There is no fundamental limit in the elastic modulus of the films that may now be used to form the diaphragm, however a higher elastic modulus may allow for better performance.

The diaphragm may be configured such that the diaphragm laminate construction (e.g. two layers of optically clear film bonded together with an adhesive) provides a composite elastic modulus of equal to or greater than 2.0 GPa. Moreover, at least one of the optically clear films used to construct this diaphragm may themselves have an elastic modulus of equal to or greater than 2.0 GPA. More preferably, the diaphragm laminate construction and at least one of the clear films used herein may provide a composite elastic modulus of greater than 3.0 GPa. The maximum elastic modulus for the clear films and/or the diaphragm laminate construction is contemplated herein not to exceed 80 GPa. Accordingly, the diaphragm laminate construction herein may have a composite elastic modulus of 2.0 GPa to 80 GPa, including all values therein, in 0.2 GPa increments.

The term "elastic modulus" herein may be understood as reference to Young's modulus. It is denoted by the letter E and it is typically measured in tension by the appropriate equipment (for example: TA Instruments Q800 Dynamic Mechanical Analyzer). In case of anisotropic characteristics of the film or diaphragm and in case no direction has been specified the term "elastic modulus" may be understood as reference to the average value of the Young's modulus for all in-plane directions of the film or diaphragm under discussion.

The term "damping" in this disclosure (also called tan delta or using the symbol δ) is known to be the ratio of loss modulus (E') to storage modulus (E"). How damping may be measured depends on what is measured: for a monolithic sheet of film materials it is preferably measured in tension with the appropriate equipment (example: TA Instruments Q800 Dynamic Mechanical Analyzer), for the damping layer (for example a relatively soft damped adhesive) one might consider to measure damping in extension but when used in a constrained layer damper configuration (as is the case here) it is preferably measured in a so called vibrating beam test in the sandwich beam configuration (example: ASTM E-756-05) as this better captures the behavior in shear. In this case the ratio of the shear values of loss and storage moduli are measured but it is well understood in the art how to calculate between tensile and shear moduli when one also knows Poisson's ratio. Damping values for the composite laminated diaphragms may be calculated using the mathematical relations known as RKU (Ross, Kerwin, Ungar) in the art and by using the moduli and damping values for the damping layers and non-damping layers as measured in the previously described methods.

In many cases the resonances of dynamic mechanical analyzer equipment limit the upper frequency at which damping and modulus can be measured to a fairly low value. For example this limit is 200 Hz for the Q800 Dynamic Mechanical Analyzer. For materials that exhibit viscoelastic properties (which will include many of the optical films, damping layers and adhesives in the present disclosure) there often is observed to be a temperature-frequency equivalence whereupon modulus and damping may be extrapolated to a frequency higher than the machine limit through an appropriate relation developed by carefully fitting data at multiple frequencies and temperatures. This temperature-frequency superposition technique is well known in the art. For example, attention is directed to "*The Handbook for Viscoelastic Vibration Damping*" by David I. G. Jones, 2001, John Wiley & Sons Ltd.

Density in this disclosure (also known as mass density) may be understood as the ratio of mass/volume and is denoted by the symbol $\rho$ (may be measured for example according to ASTM D1505-03).

There is no limit for the thickness of the diaphragm as this may vary amongst other things with the diaphragm outer dimensions, the design intent and the intended use of a specific audio transducer and the diaphragm materials chosen. However, in a preferred embodiment the thickness of the diaphragm is in the range from 100 µm to 2 mm, including all values therein, in 10 µm increments. For example, one preferred range is 100 µm to 1 mm. For the specific example of a laminate of two or more biaxially stretched PET films and a transducer to be used in conjunction with a 24" class LCD display and intended for use in a computer monitor, all-in-one PC or TV, a preferred thickness range is approximately 450 to 600 µm.

Preferably the diaphragm has a combination of relatively low composite density and relatively high composite elastic modulus as the thickness and the density ($\rho$) together determine the mass of the diaphragm which in turn may limit the high frequency output above the main system resonance of the diaphragm and may contributes to the transducer efficiency. Furthermore, the ratio of E/$\rho$ may influence the main system resonance which a designer might want to place within a certain frequency region depending on the design intent.

There is no specific limit in the density of the films and/or damping layer(s) (e.g. adhesives) that may be used to provide the diaphragms herein. However a relatively lower density for any of the films or damping layer(s) may allow for higher speaker efficiency. In a preferred implementation at least one of the optically clear films themselves has a density of less than or equal to 1500 kg/m$^3$. In another preferred embodiment the diaphragm laminate (e.g. at least two layers of film bonded with an adhesive as the damping layer) has a composite density of less than 1500 kg/m$^3$.

As alluded to above, at least two optically clear films may now be laminated together by at least one layer of an optically clear film that provides damping (preferably an adhesive) which then results in a diaphragm construction having an overall desired damping performance. Some of the benefits of this damping may include the reduction in resonances of the diaphragm, for example one-dimensional beam waves, and/or the reduction in acoustic distortion in general. In this construction the damped adhesive may act as a constrained layer damper. Constrained layer damping is known in the art to work by sandwiching a relatively soft and damped compliant layer between two or more relatively stiffer layers. As the laminate flexes the middle layer may be sheared and the damping of the middle layer may destroy mechanical energy in the form of heat. Preferably the damping layer is placed as close as is reasonably possible to the neutral axis of the laminate to maximize the shearing. For the purpose of constructing the diaphragms herein the damping layer may be selected such that it can be used as the relatively softer compliant layer in between relatively stiffer layers of the optically clear film.

In a preferred implementation the thickness, the damping tan delta, the elastic modulus as well as the location of the damping layer, which as noted may preferably be an adhesive, may collectively contribute to, (along with the damping of any other films,) a composite damping tan delta $\delta$ of the diaphragm of at least 4% ($\delta \geq 0.04$) throughout the frequency range of 500 Hz to 2000 Hz and for a temperature of 30° C. More preferably the composite damping tan delta $\delta$ of the diaphragm is at least 6% ($\delta \geq 0.06$) throughout the frequency range of 500 Hz to 2000 Hz and for a temperature of 30° C. Even more preferably the composite damping tan delta $\delta$ of the diaphragm is at least 8% ($\delta \geq 0.08$) throughout the frequency range of 500 Hz to 2000 Hz and for a temperature of 30° C. Furthermore, the composite damping tan delta of the diaphragm may be in the range of 0.04 to 0.5, including all values therein in increments of 0.01, over the frequency range from 500 Hz to 2000 Hz at 30° C.

In addition, preferably the elastic modulus (E) of the damping layer is ten times lower than the modulus of elasticity of any optically clear film(s) used as part of the diaphragm. That is, the elastic modulus of the damping layer ($E_{DL}$) may be 10% or less than the elastic modulus of any optically clear film ($E_{Film}$) used in the diaphragm construction, which may be written as $$E_{DL} \leq (0.1) E_{Film}.$$

Even more preferable is if is $E_{DL}$ is at least one hundred times lower than the modulus of elasticity of any optically clear film used as part of the diaphragm, which may be written as:

$$E_{DL} \leq (0.01) E_{Film}.$$

It is also preferable that the damping tan delta of the damping layer is at 0.1 or more ($\delta \geq 0.1$) throughout the frequency range of 500 Hz to 2000 Hz and at a temperature of 30° C. That is, it is contemplated that one may provide a diaphragm with two or more optically clear film layers, and at least one damping layer, with the feature that at least one damping layer on its own has a damping tan delta of 0.1 or more in the frequency range from 500 Hz to 2000 Hz at 30° C. Even more preferably the damping tan delta of the damping layer is at 0.2 or more throughout the frequency range of 500 Hz to 2000 Hz and at a temperature of 30° C. Furthermore, the damping tan delta of at least one damping layer may be in the range of 0.1 to 10 over the frequency range from 500 Hz to 2000 Hz at 30° C., in 0.05 increments. Moreover, the damping value tan delta of the damping layer may be at least 1.5 times as high as any of the tan delta damping values of the optically clear films.

Expanding upon this embodiment, one may therefore construct a diaphragm formed by three or more film layers with two or more damping layers. Again, the damping layers may be adhesive layers as noted above. In such example, the damping layers do not have to have the same mechanical properties, provided that at least one of the damping layers provides, as noted, a damping tan delta of 0.1 or more in the frequency range from 500 Hz to 2000 Hz at 30° C. It shall be pointed out that the additional damping layer(s) may not provide any damping at all to the diaphragm and may only provide adhesion between two optically clear films through any means.

Therefore, it may be appreciated that the present disclosure contemplates a diaphragm construction containing a plurality of film layers and a plurality of damping layers, wherein at least one of the damping layers has a damping tan delta of 0.1 or more in the frequency range from 500 Hz to 2000 Hz at 30° C., and the remaining damping layers may have a damping tan delta of less than 0.1 at the same frequency range and temperature.

Figure 3:
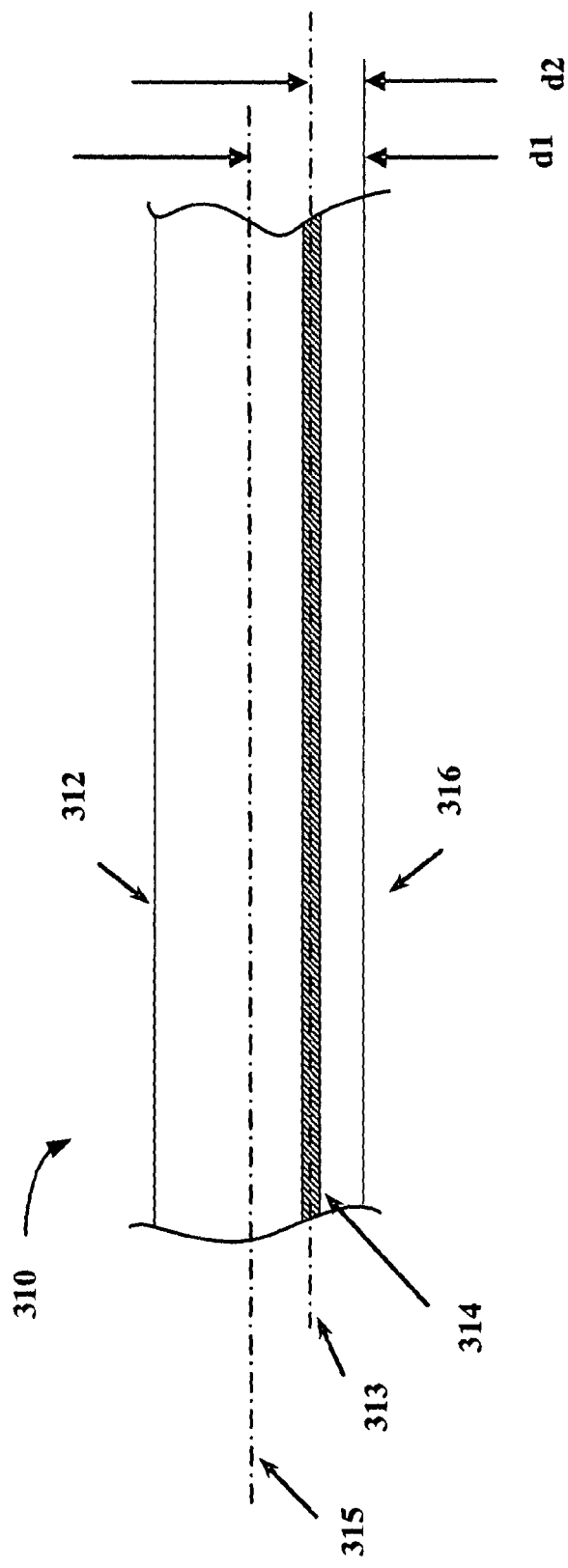
FIG. 3 is a cross-sectional view of one example of a laminated diaphragm with one damping layer where the damping layer is outside the laminate neutral axis.

Furthermore, it is preferable if the center line of at least one layer of the damping layers with the relatively high damping values noted herein is located no closer to the outside surface of the diaphragm than 25% the distance between the neutral axis of the diaphragm and the outside surface that is closest to this damping layer. Anyone skilled in structural analysis will understand what the neutral axis is with regard to bending and how to calculate it. Referring to FIG. 3, the laminated diaphragm (310) may be comprised of two relatively stiff outer layers (312, 316) and one damping layer (314). In the present construction it is possible (but is not necessary) that the relatively stiff outer layers have the same elastic modulus. As such and given the differing thicknesses of the layers 312 and 316 it becomes clear that the neutral axis of the diaphragm 315 is not contained within the damping layer 314. Nonetheless, so long as distance (d2) between the centerline 313 of the damping layer and the outside of the thinner outer layer (316 as drawn) is at least 25% of the distance (d1) between the neutral axis (315) and the outer surface of the thinner outer layer (316 as shown) then the laminated diaphragm 310 may still appreciably benefit from the constrained layer construction.

While there is no fundamental limit to the thickness of the damping layer, the upper limit of the thickness of the damping layer may ultimately become a function of the ratio of the moduli between the non-damping layers and the damping layer, the thickness ratio of the non-damping layers versus the damping layer, the placement of the damping layer with respect to the neutral axis of the laminate, the frequency of interest and the temperature range of interest. In general there may be two trends with respect to thickness of the damping layer. The laminate damping gets better with a thicker damping layer. For a relatively stiff damping layer, when compared to the outer layers, the entire laminate may improve in flexural stiffness as the center damping layer increases in thickness. However if the damping layer is substantially lower modulus than the outer stiff layers then it may be said that the flexural modulus initially improves with damping layer thickness until it reaches a maximum and then it decreases. In the proper proportions damping may be achieved without a substantial loss or even with a small increase in composite flexural stiffness of the diaphragm. Moreover, cost and space considerations may also contribute to the final thickness selection. The thickness of the damping layer(s) with the relatively high damping values herein preferably is in the range of 1 μm to 200 μm, including all values therein, in 1.0 μm increments. One preferred range is 1.0 μm to 100 μm.

For the diaphragm depicted in FIG. 2 there is no fundamental limit for the peel strength that the damping layer (214) which is adhering to the optical films (212) and (216) provides. In one preferred implementation a permanent adhesive is used with a peel strength of greater than or equal to 3N/inch. In another preferred implementation a removable adhesive is used with a peel strength of less than 3N/inch. The peel strength may also be in the range of 0.005N/inch to 500N/inch. Peel strength may be measured at room temperature using tensile testing apparatus at a peeling angle of 90 degrees and a peeling speed of 300 mm/minute.

The lamination may be conducted with multiple production processes including roll-to-roll lamination by a machine or lamination by hand. The damping layer(s) with the relatively high damping values may be applied to the optically clear film(s) in multiple ways including dispensing or screen printing on one or both sides of one or several optically clear films that are to be laminated, it can be applied as a separate roll of material, it can be applied to one or both optical films prior to the lamination step or during the lamination step or in some other way. Furthermore, the damping layer(s) with the relatively high damping values can be fixated to the films with UV light, heat, pressure or other means. The lamination can be a single step or a multi-step lamination, and may employ heat and/or pressure such as may be available in typical heated compression mold. The lamination may also occur after at least one of the optically clear films has already been mounted to the transducer frame. It also may be useful during the lamination process to monitor and ensure the optical quality of the diaphragm by minimizing the frequency and size of inclusions, bubbles, scratches and other optical disturbances. Furthermore, it may be useful to ensure that the diaphragm is resistant to heat and humidity so that that diaphragm performance and optical quality is not compromised by the lamination procedure or during its use in a transducer.

The surface of the diaphragm that faces towards the viewer may preferentially be configured to have a requisite hardness that may then improve its use with a given mechanical-to-acoustical transducer over a given period of time. Accordingly, it may be useful to configure the diaphragm to have a pencil hardness (measured according to JIS K 5600-5-4: 1999) of greater than or equal to 1H, more preferably greater than or equal to 2H. The pencil hardness may also be in the range of 1H to 9H. The surface hardness may be achieved either through the properties of the optical film itself or through a coating or other suitable surface treatment.

Throughout this disclosure there is reference to the feature of optically clear film layers and optically clear damping layers. This may be understood as reference to either a desired haze and/or total luminous transmittance property for the film and/or damping layer. That is, in order for the image of the video display to be visible the diaphragm may be configured to possess a preferable haze and total luminous transmittance characteristic. For example, the diaphragm may utilize optically clear film or damping layers having haze values (measured according to ASTM D1003-07e1) of less than or equal to 30%, more preferably less than or equal to 20%. In the case where no antiglare treatment of the diaphragm is desired the haze value is preferably at or below 4%, more preferably at or below 3% and most preferably at or below 2%. The total luminous transmittance properties of the optically clear film (s) or damping layer(s) (measured according to ASTM D1003-07e1) may be at or above 75%. In the case where no antireflective treatment of the diaphragm is desired the luminous transmittance properties may more preferably be at or above 80%. All values refer to the properties as measured during or immediately after production of the transducer. That is, the properties are best measured under those circumstances where a film is not subject to environmental changes (e.g. relatively long term exposure to elevated temperatures) that would alter the referenced haze values and/or luminous transmittance properties.

Figure 4:
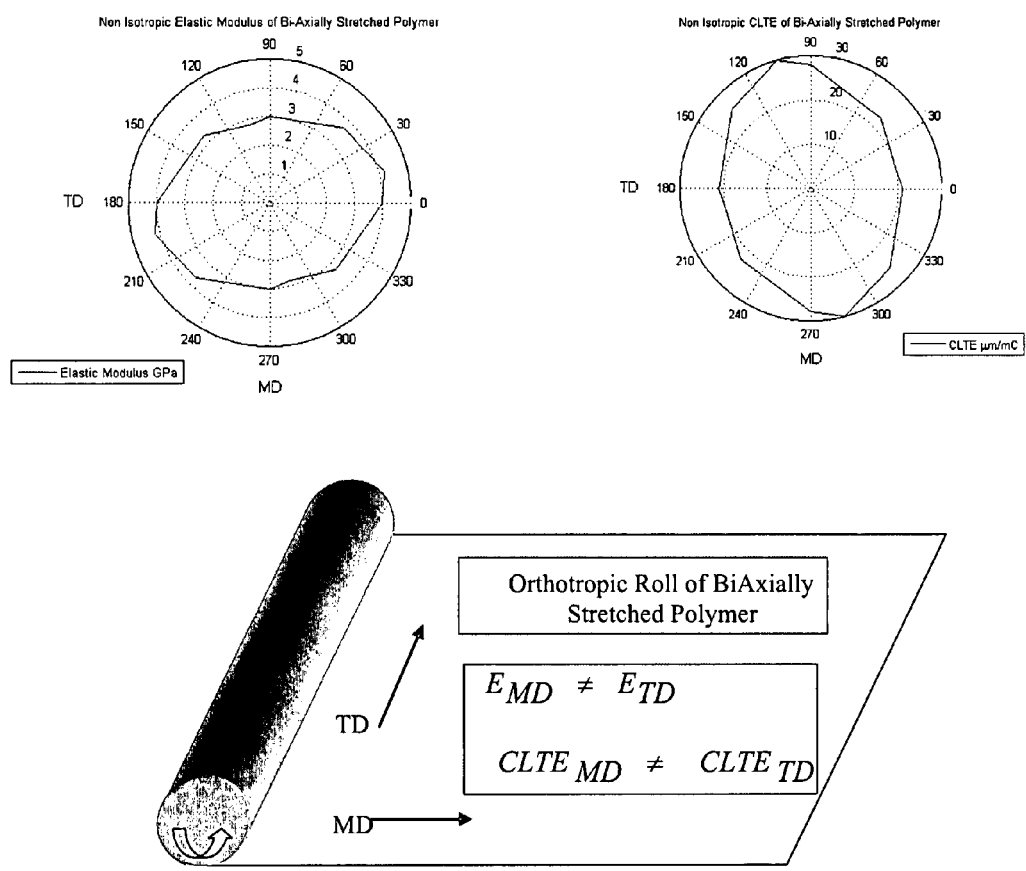
FIG. 4 illustrates a biaxially stretched polymer roll with machine direction (MD) and transverse direction (TD) and a range of CLTE and modulus (E) for each direction.

In case some of the materials used as all or part of the diaphragm exhibit heat shrinkage, the heat shrinkage is preferably less than or equal to 0.5% in the machine direction (MD) as well as in the transverse direction (TD), where MD and TD are illustrated in FIG. 4. Even more preferably the shrinkage is at or below 0.2%. Shrinkage may be measured for an unrestrained film that has been exposed to 150° C. for 30 min and allowed to cool to room temperature. Alternatively, shrinkage may be measured using thermomechanical analysis (with same temperature range) using the appropriate test equipment (example: Perkin Elmer TMA-7).

The optically clear films as well as damping layers used as part of the diaphragm can be treated on none, one or both sides of the film surface for improved adhesion of adhesives, to change their surface tension or to impart other desirable properties. One example of an optically clear film of this type is DuPont Teijin ST730. It possesses a haze value of 1.0% to 1.2% (depending on thickness used), a heat shrinkage value of 0.1% both in MD and TD (measured unrestrained at 150° C./30 min) and a total luminous transmittance of approximately 87%. The material is treated for better adhesion on both surfaces.

Figure 5:
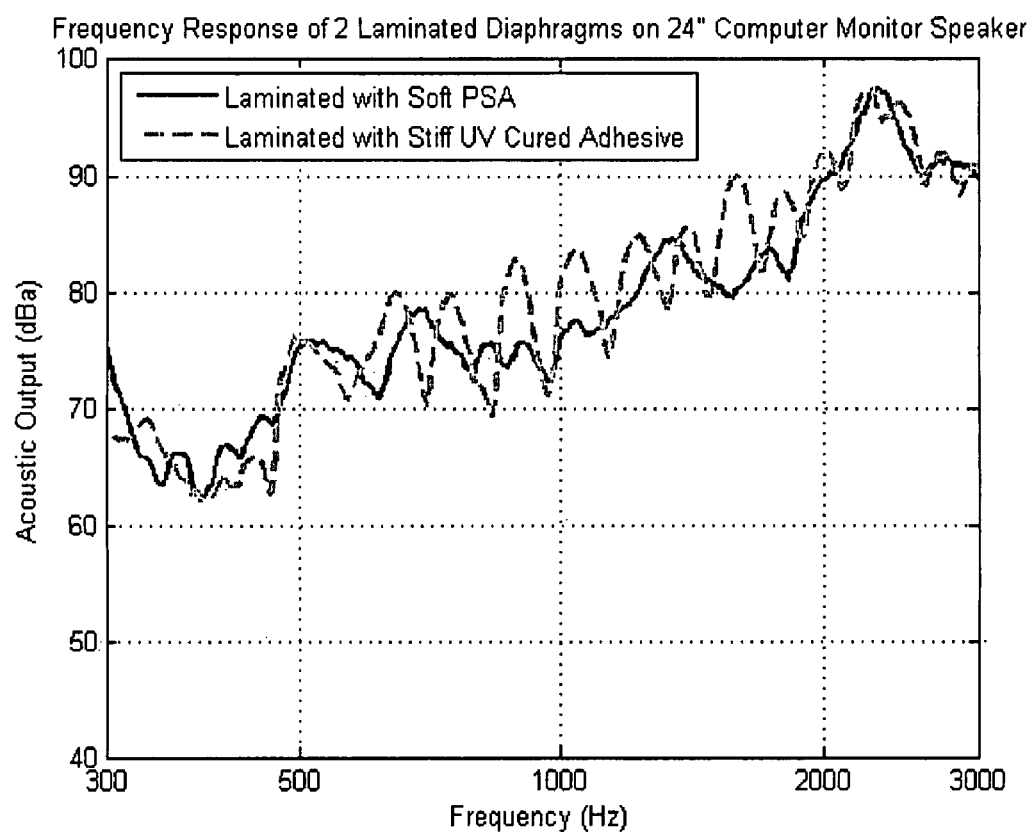
FIG. 5 illustrates one example of utilizing a relatively soft damped adhesive versus utilizing a relatively stiff adhesive on a 24" audio transducer.
Figure 6:
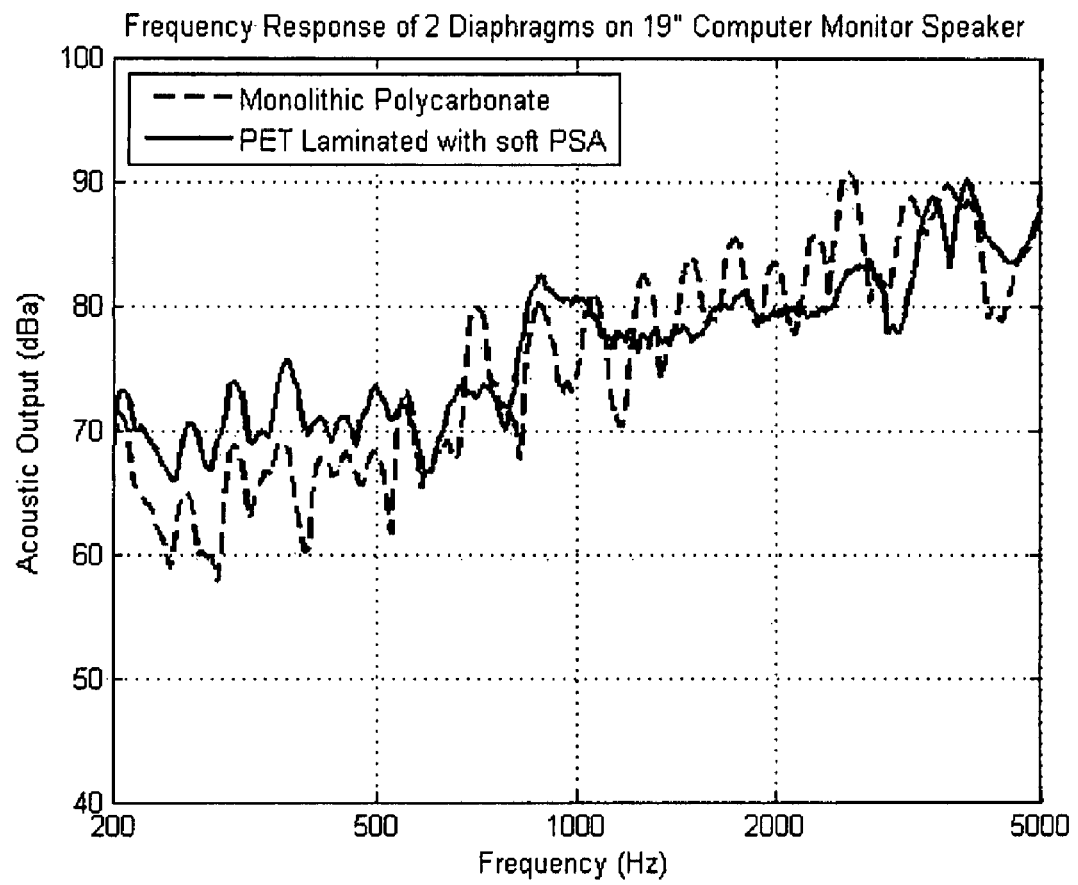
FIG. 6 provides a comparison of a laminated biaxially stretched PET versus a monolithic polycarbonate diaphragm on a 19" audio transducer.

In one preferred implementation of a diaphragm for a transducer for a 24" class LCD display and intended for use in a computer monitor, all-in-one PC or TV the following materials can be used to construct the diaphragm: bi-axially stretched, optically clear PET film with 250 µm thickness (DuPont Teijin ST730, available from DuPont Teijin Films U.S., Hopewell, Va.) and a 25 µm thick optically clear acrylic pressure sensitive adhesive (PSA) such as 3M 8211, 3M 8141 (both: 3M Corporation, St. Paul, Minn.) or ARclear 8154 (Adhesives Research, Glen Rock, Pa.). When paired in a sandwich of 250 µm PET, 25 µm PSA, and 250 µm PET, the damping of the resulting diaphragm will increase by more than a factor of 1.5 over that of the PET material in the region of 500 to 2000 Hz at 30° C. As a result the frequency response of the transducer will be significantly smoother. FIG. 5 shows the damping benefits of this preferred implementation of a diaphragm for a 24" class audio transducer where 3M 8141 PSA (pressure sensitive adhesive) was used as the damping layer for this measurement. Furthermore, FIG. 5 also shows the performance of the same audio transducer with a different diaphragm. In this different diaphragm the 25 µm layer of 3M 8141 PSA has been replaced by a layer of a relatively stiffer adhesive (Norland NOA61, UV cured, thickness of adhesive layer is approximately 25 µm, E is approximately 1.0 GPa). It can be seen in FIG. 5 that in the range of 500 Hz to 2000 Hz the peaks in the frequency response are smoothed for the 3M 8141 PSA implementation relative to the Norland NOA61 implementation making the 3M 8141 PSA implementation preferrable. Moreover it can be seen that the additional relative stiffness of the UV adhesive does not impart a significant increase in the level of acoustic output. Furthermore, FIG. 6 shows the damping benefits of the preferred implementation of a diaphragm for the 24" class transducer using a damping layer of an acrylic based pressure sensitive adhesive relative to a monolithic optically clear polycarbonate membrane of 500 µm thickness (no lamination and no adhesive involved). Again, it can be seen that in the range of 500 Hz to 2000 Hz the peaks in the frequency response in FIG. 6 are smoothed for such preferred implementation relative to the polycarbonate diaphragm.

Optically clear acrylic based pressure sensitive adhesives suitable for use as the damping layer herein typically have a damping value tan delta δ in the range of 0.2 to 2 at a temperature of 30° C. and at a frequency range of 500 to 2000 Hz, though material with higher or lower values may be available and may be used as well. The specific value depends on material composition, temperature and frequency. Furthermore, the elastic modulus of such acrylic based pressure sensitive adhesives is typically less than or equal to 2% of the value of biaxially stretched PET at a temperature of 30° C. and at a frequency range of 500 to 2000 Hz.

The coefficient of linear thermal expansion (CLTE) for the film material for the diaphragm may have a CLTE in the machine direction (MD) that is substantially the same as the CLTE in the transverse direction (TD). More specifically, the CLTE for the MD and TD may be within ±3 µm/m/° C. of one another. The CLTE for the film material may be at or below 50 µm/m/° C. Furthermore, it is contemplated that the CLTE for the films may be in the range of 1 µm/m/° C. to 50 µm/m/° C., including all values therein, in 1.0 µm/m/° C. increments. CLTE may be measured according to ASTM E831-06 and the values listed in this filing are intended to refer to a temperature range of 20° C. to 50° C. unless stated otherwise.

Typically, at least one of the optically clear films may be coated on the outside with an optically clear hardcoat (for example Terapin G from Tekra, New Berlin, Wis.) or with an optically clear anti-glare coating (for example Terapin AG from Tekra). Other coatings that can be applied can include but are not limited to antireflective coatings (preferably applied in a wet coating process), antistatic coating, antismudge coating, conductive or other suitable coating. Furthermore a reflection prevention processing, sticking prevention layer, antiglare prevention surface, etc. may be prepared as part of the optically clear film itself. Some or all of the surfaces of the individual film and the finished diaphragm may be protected with a masking film before, during and/or after the lamination process.

Although each optically clear film material that forms the diaphragm may be of the same material and may be of materials of different type (e.g. different material or polymeric composition) it is preferable that at least the two outside layers are in fact chemically similar. For example, in the case of polymeric material, it is preferable that the two outside layers have the same repeating unit structure, or at a minimum, share the same repeating unit structure while having some other dissimilar repeating units within the polymer network (e.g. copolymers that have at least one repeating unit structure in common).

Figure 7:
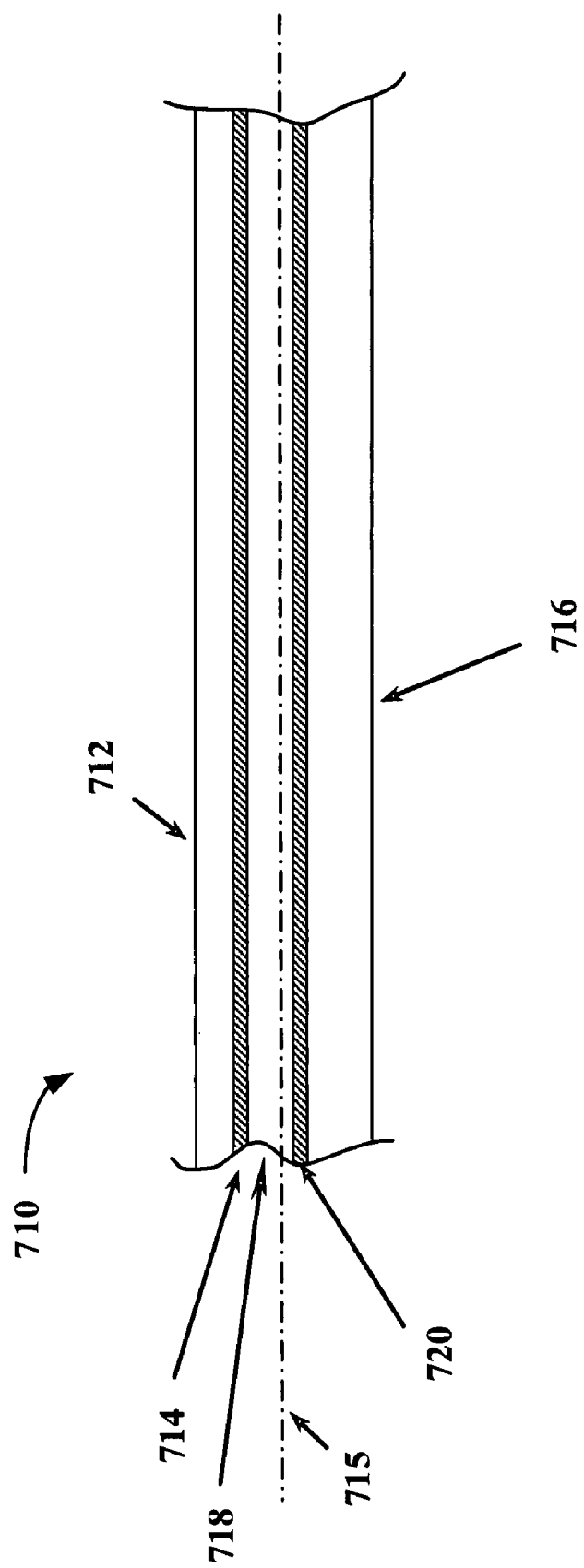
FIG. 7 is a cross-sectional view of one example of a three layer optically clear diaphragm with two damping layers.

Attention is next directed to FIG. 7 which illustrates yet another embodiment of the present invention. As can be seen, shown generally at 710 is a diaphragm which contains three optically clear films at 716, 718 and 712. Two optically clear adhesive layers are illustrated at 714 and 720. The centerline of the diaphragm is shown at 715.

It may therefore be appreciated that there may be situations where the thickness of the three films may all vary, such as the situation where one may wish to employ an outer layer that contains a specific coating or which contains a desired surface processing, and which layer is only available at a relatively reduced thickness. For example, this may be the situation when one may wish to provide an outer film layer which contains an antireflective coating. Optically clear films with antireflective coatings may generally be available at thickness between 40 μm to 175 μm, including all values therein, in 1.0 μm increments. For example, one may source an optically clear film with an antireflective coating that has a thickness of 100 μm.

As may now be appreciated, the desired diaphragm thickness and damping characteristics may be achieved by laminating in the manner noted above, and as generally illustrated in FIG. 7. Furthermore, at least one of the layers of adhesive may provide a damping tan delta of 0.1 or more in the frequency range from 500 Hz to 2000 Hz at 30° C.

Expanding upon the above, in one preferred implementation of a diaphragm with antireflection properties for a transducer for a 24" class LCD display and intended for use in a computer monitor, all-in-one PC or TV, a sandwich of 250 μm PET, 25 μm PSA, 175 μm PET, 25 μm PSA and 100 μm PET (as the outer layer) with an antireflective coating may be used. For the PET with antireflection coating the ReaLook film in the grade 9108 from Nippon Oil and Fat (NOF Corporation, Tokyo, Japan) may be used. ReaLook9108 grade is available with a 25 μm PSA already pre-applied. For the other two PET layers Dupont Teijin ST730 may be used and for the remaining PSA layer 3M 8211 or Adhesives Research ARclear 8154 may be employed.

In another preferred implementation of a diaphragm consisting of three optically clear films such diaphragm may be configured such that both outer layers have a relatively higher elastic modulus than the middle layer of the diaphragm laminate. For example, optically clear polymethylpentene (tradename TPX) is an extremely light material with density in the range of 830 kg/m$^3$ and damping on the order of δ~0.08 (measured at 25 C, 200 Hz). Polymethylpentene material has a relatively low elastic modulus generally below 2 GPa. Thus while it is less desirable as a monolithic material it may be employed to provide additional damping to the diaphragm (in addition to the damping layer(s)) and to reduce the composite density of the diaphragm. In one preferred implementation polymethylpentene is placed between two relatively stiff outer layers, selected from acrylates (e.g. poly(methyl methacrylates), aromatic polyesters (e.g. PET) and/or poly(ethylene naphthalate) (PEN) and these three film layers are laminated together with two 25 μm thick layers of PSA or some other highly damped and soft adhesive. These outer layer materials are substantially stiffer but also have correspondingly higher density. In this combination the diaphragm composite will possess a very high ratio between flexural stiffness and density as well as good damping which ultimately will provide good characteristics for use in the mechanical-to-acoustical transducer as noted above.

In another implementation a diaphragm is constructed that contains at least one optically clear film, at least one damping layer and at least one film that is a light polarizing film. There may be several reasons why one may want to add a polarizing film to the diaphragm. For example the polarizing film may be applied in order to replace the outward facing polarizing film of a video display (for example a liquid crystal display panel) in order to reduce the overall cost of the video display and the diaphragm. Another reason might be to provide for contrast enhancement and glare reduction by suppressing internal reflections from external ambient light (usually in combination with a quarter wave retarder film).

The polarizing film may consist of just a polarizer material or it may be a laminate of multiple films such as a polarizing material with layers of protective film on one or both sides and/or a polarizing material in conjunction with a retarder film. The polarization orientation of the film may be matched with the orientation of the light emitted from the underlying video display in order to provide for maximum light transmittance. However, it should be noted that the total luminous transmittance of the polarizing film is lower than for optically clear film due to its polarizing nature. In one preferred implementation the total luminous transmittance of the polarizing film is greater than or equal to 40%. One example of an implementation is the use of a 250 um PET film such as DuPont ST730 and a 190 um polarizing film such as NPF-SEG1224DU (available from Nitto Denko, Tokyo, Japan). The polarizing film comes with a PSA of 25 um applied. When assembled as a transducer and used with a video display the diaphragm is oriented in such a way that the PET film is facing to the outside (towards the viewer) and the polarizer is facing towards the video display. The PSA layer of the polarizer represents the damping layer.

In another implementation a diaphragm is constructed that consists of at least two optically clear films, at least one damping layer and at least one layer that enables the diaphragm to act as a touch screen. The physical principle of this touch screen functionality is not limited to any specific principle. Examples for touch screen technologies that might be supported by the diaphragm include capacitive, resistive, surface acoustic wave, optical and infrared touch screens. Examples for one or several layers that enables the diaphragm to act as a touch screen may be a conductive layer made of ITO material or conductive polymers.

Frame and Diaphragms with Substantially Matched CLTE

The ability to minimize the thickness of a transducer frame may be important for some applications of the above referenced acoustic transducers that are coupled to an edge of a given diaphragm. In these applications a relatively thin frame may be desired for visual and aesthetic reasons. In order to achieve a given stiffness of a frame with the minimum thickness of material and otherwise fixed design constraints one may select a frame material with relatively high elastic modulus such as a metal or a reinforced (filled) polymer whereas the diaphragm is generally an optically clear, unfilled polymer. In general metals and reinforced polymers have a substantially lower coefficient of linear thermal expansion than optically clear, unfilled polymers. In general the CLTE of metals and certain reinforced polymers can be in the range from 5-35 μm/m/° C. and the CLTE of optically clear polymers will range from 50-200 μm/m/° C.

This mismatch in the CLTE of frame and diaphragm may cause undesirable optical reflections. An example for a CLTE mismatch in a practical implementation occurs when a flat panel TV with an integrated optically clear acoustic transducer is turned on and subsequently the video panels heats up to its operating temperature. The heat generated by the operation of the video panel is radiated into the surrounding air, some of which is trapped between the video panel and the transducer diaphragm and transducer frame. In turn this air heats up the diaphragm and the frame and causes them to expand. In addition, there can also be direct thermal conduction from the video panel into the frame and diaphragm. The CLTE mismatch of diaphragm and frame may cause the diaphragm to expand at a higher rate then the frame when exposed to a temperature rise. This in turn causes the diaphragm to change its shape away from its intended, ideal shape. The change in shape can happen in a multitude of ways. Examples are a changed diaphragm where the general shape of the curve of the diaphragm remains however the chord height of the arc of the curve is increased, or a diaphragm with a different curve shape such as multiple areas of waviness or dimples of the diaphragm or combinations thereof. This change in shape may negatively impact the acoustic performance by changing the acoustic frequency response. Furthermore, such a change in shape may cause optical disturbance for example in the form of additional, unwanted optical reflections.

There is thus a need for a diaphragm/mechanical-to-acoustical transducer which is coupled at the edge of the diaphragm that possesses desirable acoustical performance properties and that at the same time exhibits a relatively low CLTE in order to enable the transducer frame to be made relatively thin.

Accordingly, in yet another embodiment designed to optimize the performance of a mechanical-to-acoustical transducer, and in those situations where acoustical performance may not be as critical (i.e. utilizing damped layer(s) with relative high degree of damping as noted above) one may desire to provide a diaphragm configuration that will optimize the CLTE of the diaphragm to that of a given mechanical-to-acoustical transducer support frame. Accordingly, one may optionally elect not to incorporate one or more damping layers, as noted above.

Accordingly, various types of optically clear film can be used in such embodiment, optionally with a damping layer, as long as they exhibit a CLTE of less than or equal to 50 µm/m/° C. in one or both of the machine direction (MD) or transverse direction (TD). Such CLTE value may therefore be, e.g. less than or equal to 40 µm/m/° C., or less than or equal to 35 µm/m/° C. One method to achieve said CLTE properties in combination with optical clarity can be achieved by bi-axially stretching polymeric film. For example, bi-axially stretched PET and PEN, polyester copolymers of PET and PEN, copolymers comprising more than 70% by weight of either PET or PEN, and polymer blends formed by combination of suitable polymers providing that the blend exhibits orientation characteristics typical of PET and PEN during the film forming process can be used. Furthermore, biaxially stretched cellulose acetate (CA) may be used, specifically cellulose diacetate or cellulose triacetate, which substituted cellulosic materials may also include various additives such as plasticizers and other relatively low molecular weight compounds. Additionally this embodiment contemplates the use of a relatively stiffer optically clear fibers of matched index of refraction to the materials used for the optically clear films, such that they may contribute to relative stiffness while reducing the relative amount of thermal expansion.

The lamination that may be utilized herein is not limited to any specific method. For example, one may use heat and/or pressure. It is useful to control the lamination procedure such that one provides the optical clarity noted herein (i.e. haze values of less than or equal to 30% and/or total luminous transmittance properties of the optically clear film(s) or damping layer(s) may be at or above 75%). In one preferred implementation a relatively thin layer of UV cured adhesive and a roll-to-roll lamination process are used because they are a very cost effective lamination method.

In yet another preferred implementation of a diaphragm for a transducer for a 24" class LCD display and intended for use in a computer monitor, all-in-one PC or TV the following materials can be used to construct the diaphragm: two bi-axially stretched, optically clear PET films with 250 µm thickness each (DuPont Teijin ST730) and one optically clear UV cure damping adhesive layer (Norland Products Adhesive #61, thickness of adhesive layer is approximately 25 µm). Such film has a CLTE of 19 µm/m/° C. (in the temperature range of 20° C.-50° C.). The resulting diaphragm also has a composite CLTE of approximately 19 µm/m/° C. (in the temperature range of 20° C.-50° C.). In a preferred implementation such diaphragm may used in conjunction with a transducer frame which four sides are made primarily of aluminum with a typical CLTE of 22 µm/m/° C. The resulting mismatch of CLTE is minimized to approximately 3 µm/m/° C.

Figure 8:
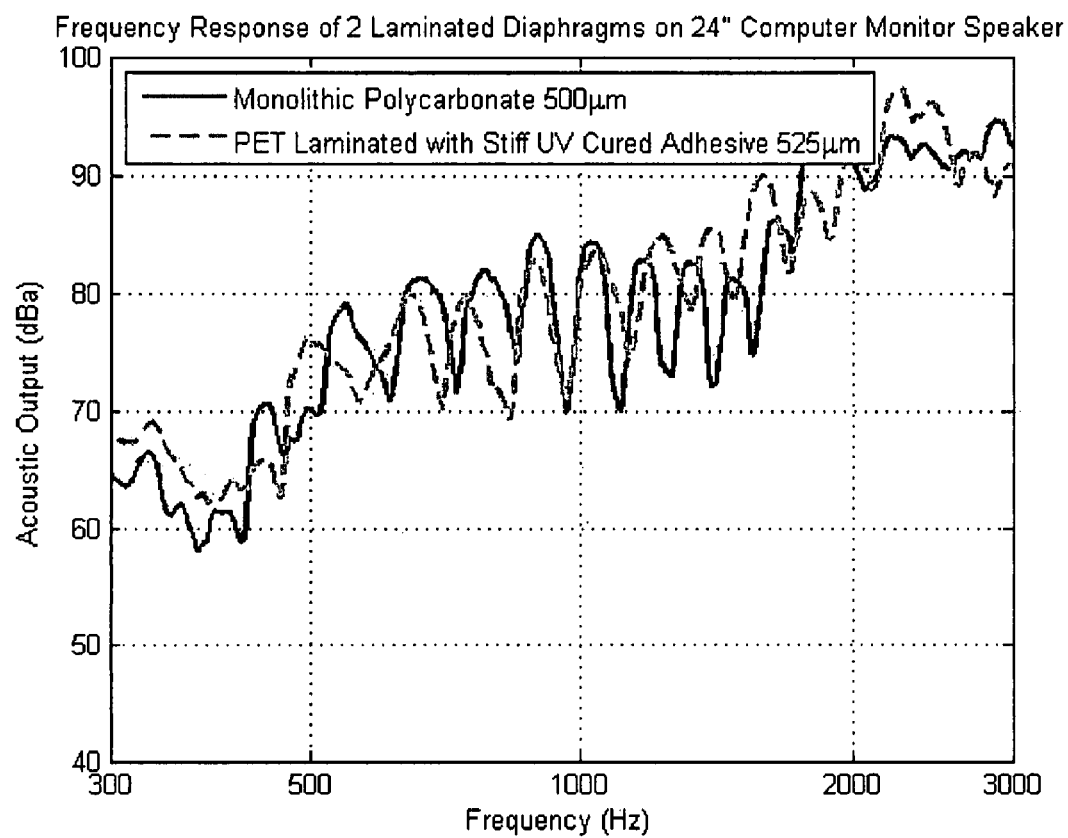
FIG. 8 provides a comparison of a diaphragm laminated from biaxially stretched PET with a relatively stiff adhesive versus a monolithic polycarbonate diaphragm on a 24" audio transducer.

It can be seen in FIG. 8 that for the frequency range of 500 Hz to 2000 Hz the smoothness of the frequency response of this construction is comparable to the one obtained with a 500 µm thick diaphragm made of monolithic polycarbonate. However, polycarbonate has a CLTE of typically 70 µm/m/° C. which results in a CLTE mismatch to the desired aluminum frame construction of approximately 48 µm/m/° C. in both in-plane dimensions of the diaphragm. It should be noted that a damped adhesive layer such as 25 µm of acrylic pressure sensitive adhesive may be used as well. However, as noted above, in this embodiment, it is not required to use a damping layer, and one may simply utilize an adhesive or any other lamination method which does not amount to a damping layer having a damping value tan delta of more than 0.1. Said adhesive or lamination method may result in a thickness of the lamination layer of more or less than 25 um.

Furthermore, the production cost of such a diaphragm may be relatively lower than for a diaphragm containing a damping layer which might make such a preferable optional construction. Furthermore, other aspects of a diaphragm without a damping layer might be preferable over a diaphragm containing a damping layer—for example the resistance of the lamination to heat and humidity. One may appreciate that this concept can be extended to laminates of more than two optically clear films and more than one damping layer as long as the composite in-plane CLTE of the diaphragm is within the desired range.

Figure 9:
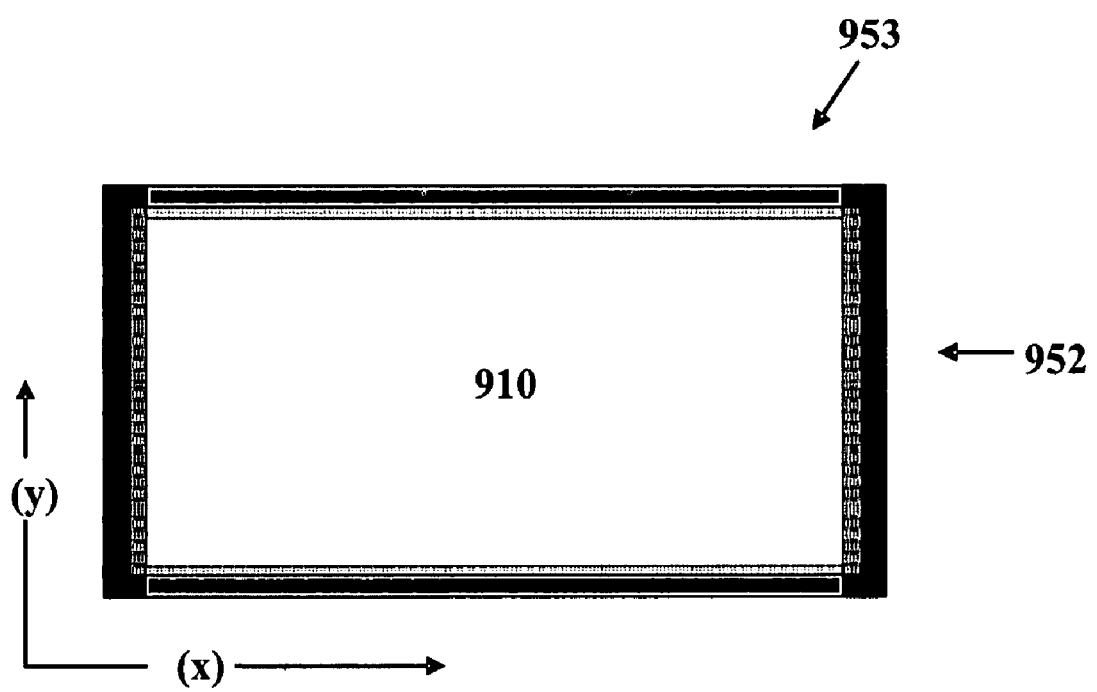
FIG. 9 illustrates one example of a hybrid speaker frame and diaphragm with an orthotropic diaphragm matching the CLTE in each direction of the frame.

FIG. 9 depicts another embodiment where a diaphragm is constructed with an orthotropic CLTE and where such diaphragm may be paired with a hybrid frame construction that has a similar difference in its CLTE. Bi-axially stretched polyester type polymers may exhibit orthotropic material properties. For example PET and PEN films can be produced to have a CLTE of 30 µm/m/° C. in the machine direction (MD) and only 20 µm/m/° C. in the tension direction (TD). As therefore shown in FIG. 4, the CLTE maxima or minima may not perfectly align with the machine direction (MD) nor the tension direction (TD). Nonetheless for the purpose of economic use of films in roll form it may be preferable to orient cutting of rectangular sheets in directions aligned with the roll direction (MD). As such, reference to orthotropic properties means that whatever the orientation of how the sheet was cut from the roll, the material properties (for example E and CTLE) may vary in 2 orthogonal directions of the resulting cut rectangular sheet.

As such it is possible to utilize this property to build a hybrid transducer frame where the members aligned with the diaphragm MD may have a substantially different CLTE than those frame members aligned in the diaphragm TD direction and at the same time maintain a minimum CLTE mismatch in 2 directions. One preferred implementation is a rectangular transducer frame constructed from aluminum side rails with a CLTE of 22 µm/m/° C. and glass re-inforced ABS with a CLTE of approximately 35 µm/m/° C. Shown in FIG. 9 is such an assembly, the frame members (952) generally aligned in the y direction are constructed from material y and frame members (953) generally aligned in the x direction are constructed from material x. The orthotropic diaphragm (910) has CLTE properties such that in the x direction it is generally close to the CLTE of (953) frame material x and in the y direction it is generally close to the CLTE of (952) frame material y. As previously discussed the preferred implementation in each direction is that the CLTE mismatch for both in-plane dimensions of the diaphragm should be no greater than 20 μm/m/° C., more preferably no greater than 10 μm/m/° C. and most preferably no greater than 5 μm/m/° C.

Figure 10:
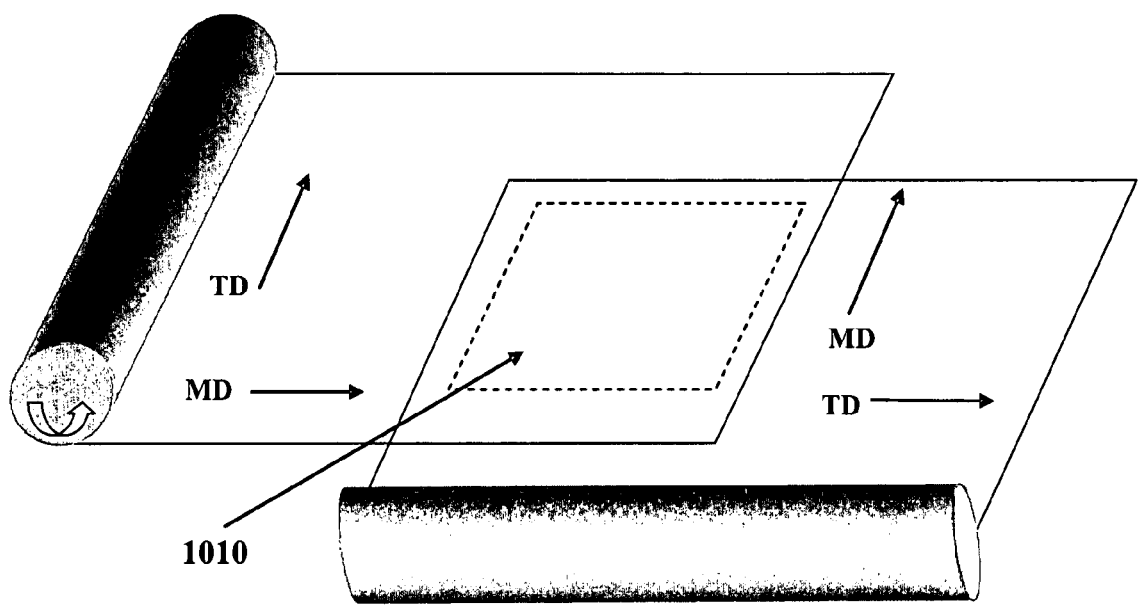
FIG. 10 illustrates one example of the construction of a laminated diaphragm utilizing different orientations of orthotropic polymer material.

Shown in FIG. 10 is an alternate construction of the diaphragm laminate (1010). It can be constructed such that the orientation of the orthotropic layers are alternated in such a way to reduce anisotropicity in the plane. Ultimately this may produce a laminate that is more isotropic in plane and thus a transducer frame may be constructed out of materials with the same CLTE for all components and still maintain a minimum mismatch of CTLE.

Figure 11:
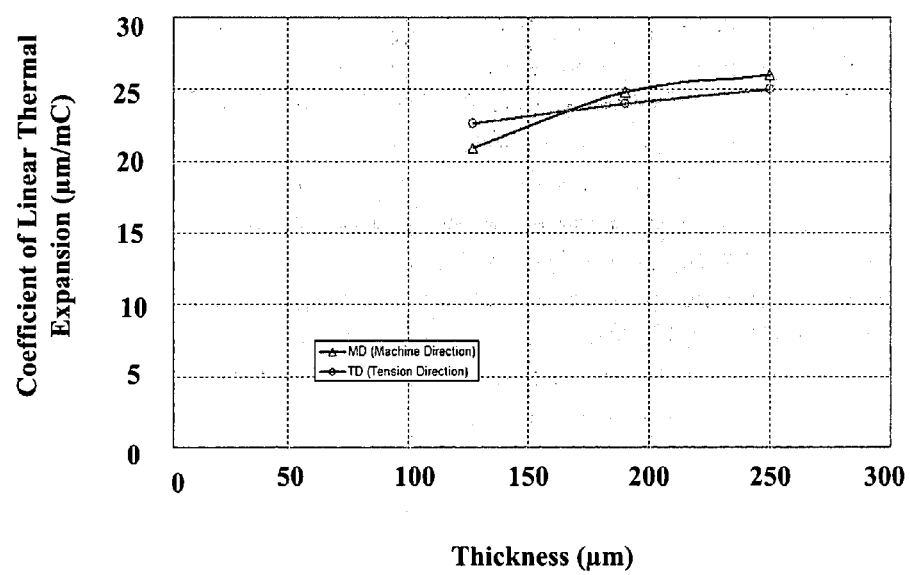
FIG. 11 is a plot of the coefficient of linear thermal expansion (CLTE) versus thickness for biaxially stretched PET.

In another lamination strategy, the change of the CLTE with regard to thickness the base material may be exploited to reduce the overall CLTE of the laminate. For example biaxially stretched PET is known to exhibit this phenomenon in some cases (see FIG. 11). When for example a laminate is constructed from three sheets of 175 μm thickness instead of two sheets of 250 μm thickness then the overall laminate CLTE may be reduced for a construction of nearly the same overall thickness.

Figure 12:
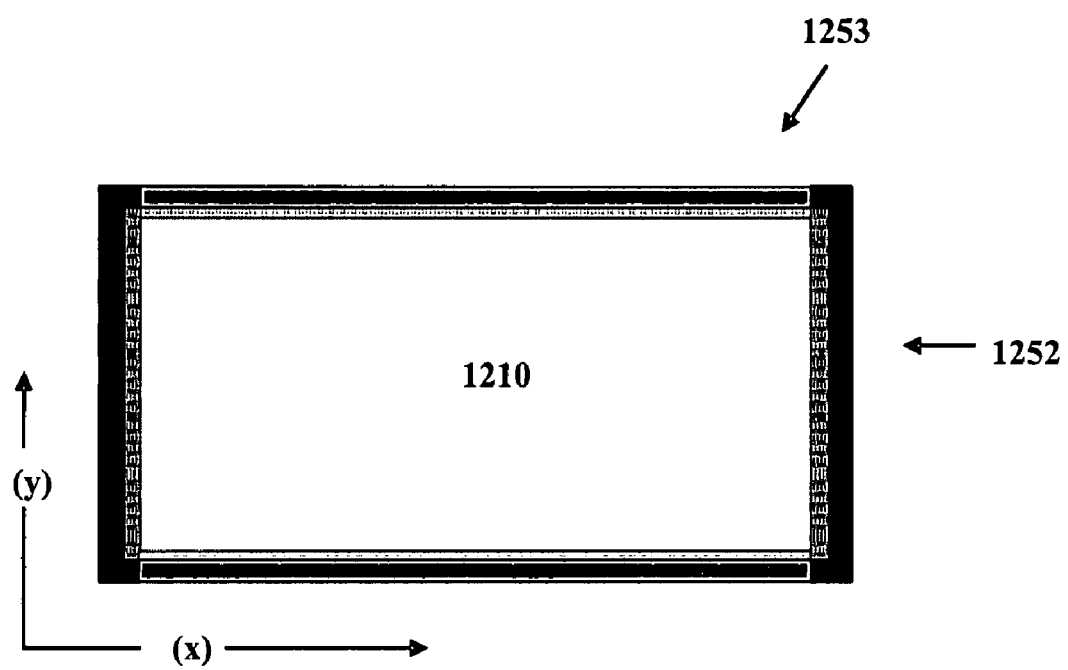
FIG. 12 illustrates one example of an aligned orthotropic diaphragm which may be used to control spacing of modes.

FIG. 12 depicts yet another embodiment where the orthotropic E of the bi-axially stretched polymer diaphragm (1210) may be used to tune the system to separate component resonances. Bi-axially stretched polyester type polymers exhibit largely orthotropic material properties. For example optically clear PET films may have a tensile modulus E=3.0 GPa in the machine direction (MD) and E=4.0 GPa in the tension direction (TD)—see FIG. 4. This is a process variable related to the stretch ratio and is only shown as one example. The orientation of the stiffer direction of the film has direct impact on the acoustic output of speakers. At least one of these speaker designs is such that 2 sides (1252) of a rectangular frame are driven by piezo actuators mounted in the transducer frame and 2 sides (1253) of the diaphragm are mounted by some means passively to the frame. As such the predominant production of undesirable acoustic modes emanate in the direction that runs between opposing piezo actuators (direction x as shown in FIG. 12). It is useful in speaker design to assemble the system such that resonances of individual components do not align with resonances from other components. The modulus of elasticity in the x direction contributes to the resonant frequencies of the diaphragm with the approximate proportion of: $\omega_n \propto \sqrt{E_x}$. Given the large range of E from MD to TD, the alignment of MD and TD within diaphragm (1210) with respect to frame members (1252, 1253) has an impact on the resonant frequencies of the diaphragm between the piezo actuators (in the x direction). Thus the orthotropic stiffness of the diaphragm presents an opportunity for the designer to redistribute the modal behavior within the whole system by simply reorienting how the diaphragm is cut off the roll of the film. Thus this is a further feature of the present invention.

Various embodiment of the present invention have been presented herein relating to a diaphragm that may be employed with a mechanical-to-acoustical transducer. It should therefore be understood that all of the various features amongst the various embodiments may be exchanged to either optimize audio performance and/or the ability of the diaphragm/transducer to accommodate various operational and/or environmental conditions, such that any one embodiment herein may include any one or more of the various features described above.

The invention claimed is:

1. A diaphragm for use with a mechanical-to-acoustical transducer comprising:
    (a) a layer of optically clear film;
    (b) a damping layer;
    (c) a layer of optically clear film; wherein the diaphragm has a composite damping value of tan delta equal to or greater than 0.04 in the frequency range of 500 Hz to 2000 Hz at 30° C., wherein said diaphragm has a total luminous transmittance of equal to or greater than 75%, and wherein the two optical films each have a modulus value and the damping layer has a modulus value and the damping layer modulus value is at least ten times lower than the modulus value of the smaller of the two modulus values for said optical films.

2. A diaphragm for use with a mechanical-to-acoustical transducer comprising:
    (a) a layer of optically clear film;
    (b) a damping layer;
    (c) a layer of optically clear film; wherein the diaphragm has a composite damping value of tan delta equal to or greater than 0.04 in the frequency range of 500 Hz to 2000 Hz at 30° C., wherein said diaphragm has a total luminous transmittance of equal to or greater than 75%, and wherein the two optical films each have a modulus values and the damping layer has a modulus value and the damping layer modulus value is at least one hundred times lower than the modulus value of the smaller of the two modulus values for said optical films.

3. A diaphragm for use with a mechanical-to-acoustical transducer comprising:
    (a) a layer of optically clear film;
    (b) a damping layer;
    (c) a layer of optically clear film; wherein the diaphragm has a composite damping value of tan delta equal to or greater than 0.04 in the frequency range of 500 Hz to 2000 Hz at 30° C., wherein said diaphragm has a total luminous transmittance of equal to or greater than 75%, and wherein said composite damping value tan delta of the diaphragm is at least 1.5 times as high as any of the tan delta damping values of the optically clear films at said frequency range from 500 Hz to 2000 Hz at 30° C.

4. A diaphragm for use with a mechanical-to-acoustical transducer comprising:
    (a) a layer of optically clear film;
    (b) a damping layer;
    (c) a layer of optically clear film; wherein the damping layer has a damping value of tan delta that is equal to or greater than 0.1 at said frequency range from 500 Hz to 2000 Hz at 30° C., and wherein the two optical films each have a modulus value and the damping layer has a modulus value and the damping layer modulus value is at least ten times lower than the modulus value of the smaller of the two modulus values for said optical films.

5. A diaphragm for use with a mechanical-to-acoustical transducer comprising:
    (a) a layer of optically clear film;
    (b) a damping layer;
    (c) a layer of optically clear film; wherein the damping layer has a damping value of tan delta that is equal to or greater than 0.1 at said frequency range from 500 Hz to 2000 Hz at 30° C., and wherein the two optical films each have a modulus values and the damping layer has a modulus value and the damping layer modulus value is at least one hundred times lower than the modulus value of the smaller of the two modulus values for said optical films.

6. A diaphragm for use with a mechanical-to-acoustical transducer comprising:
    (a) a layer of optically clear film;
    (b) a damping layer;

(c) a layer of optically clear film; wherein the damping layer has a damping value of tan delta that is equal to or greater than 0.1 at said frequency range from 500 Hz to 2000 Hz at 30° C., and wherein the composite damping value tan delta of the diaphragm is at least 1.5 times as high as any of the tan delta damping values of the optically clear films at said frequency range from 500 Hz to 2000 Hz at 30° C.

* * * * *